US011772319B2

(12) United States Patent
Wesely et al.

(10) Patent No.: US 11,772,319 B2
(45) Date of Patent: Oct. 3, 2023

(54) METHOD AND DEVICE FOR MANUFACTURING A PIPE SHELL FROM AN INSULATING MATERIAL

(71) Applicant: SAINT-GOBAIN ISOVER, Courbevoie (FR)

(72) Inventors: Nikolaus Wesely, Impflingen (DE); Harald Ligtenberg, Kürten (DE); Hans-Joachim Höller, Bergisch Gladbach (DE); Romain Lecomte, Cologne (DE)

(73) Assignee: SAINT-GOBAIN ISOVER, Courbevoie (FR)

(*) Notice: Subject to any disclaimer, the term of this patent is extended or adjusted under 35 U.S.C. 154(b) by 127 days.

(21) Appl. No.: 17/429,693

(22) PCT Filed: Feb. 10, 2020

(86) PCT No.: PCT/EP2020/053343
§ 371 (c)(1),
(2) Date: Aug. 10, 2021

(87) PCT Pub. No.: WO2020/165100
PCT Pub. Date: Aug. 20, 2020

(65) Prior Publication Data
US 2022/0105671 A1 Apr. 7, 2022

(30) Foreign Application Priority Data
Feb. 12, 2019 (DE) ..................... 10 2019 103 498.1

(51) Int. Cl.
B29C 53/56 (2006.01)
B29C 33/04 (2006.01)
(Continued)

(52) U.S. Cl.
CPC .......... *B29C 53/566* (2013.01); *B29C 33/046* (2013.01); *B29C 53/562* (2013.01);
(Continued)

(58) Field of Classification Search
CPC ..... B29C 53/56; B29C 53/562; B29C 53/566; B29C 53/845
See application file for complete search history.

(56) References Cited

U.S. PATENT DOCUMENTS 3,406,231 A 10/1968 Ullman et al.
3,975,479 A 8/1976 McClean
(Continued)

FOREIGN PATENT DOCUMENTS

CN 1161677 10/1997
DE 1571482 2/1970
(Continued)

OTHER PUBLICATIONS

Wesely et al., Method and Device for Manufacturing a Pipe Shell From an Insulating Material, Patent Cooperation Treaty Application Serial No. PCT/EP2020/053343, filed Oct. 2, 2019, International Search Report dated May 15, 2020.
Wesely et al., Method and Device for Manufacturing a Pipe Shell From an Insulating Material, German Patent Application Serial No. 102019103498.1, filed Feb. 12, 2019, Search Report of German Intellectual Property Office dated Dec. 2, 2019.
(Continued)

*Primary Examiner* — Carson Gross
(74) *Attorney, Agent, or Firm* — Schmeiser, Olsen & Watts LLP

(57) ABSTRACT

The invention relates to a method and a device for manufacturing a pipe shell from an insulating material by means of which the cycle times can be further reduced while the quality of the pipe shell is simultaneously improved, by at least one web (29) of the insulating material which is provided with a binding agent being wound around a core (19) by means of at least two opposing belts (12, 13) which wrap around the core (19) partially. The method steps are
(Continued)

characterized in that the at least one wound-up web (32) of insulating material is removed in a radial direction of the core (19) which is, however, not opposite to the direction in which the at least one web (29) of insulating material was fed by the one belt (12), especially by the wound-up web (32) being discharged through the same belt (12).

3 Claims, 4 Drawing Sheets

(51) Int. Cl.
- *B29C 53/80* (2006.01)
- *B29C 53/82* (2006.01)
- *B29C 53/84* (2006.01)
- *B29L 23/00* (2006.01)

(52) U.S. Cl.
CPC ........ *B29C 53/8016* (2013.01); *B29C 53/828* (2013.01); *B29C 53/845* (2013.01); *B29C 2053/8025* (2013.01); *B29K 2995/0015* (2013.01); *B29L 2023/225* (2013.01)

(56) References Cited

U.S. PATENT DOCUMENTS

| | | | |
|---|---|---|---|
| 2002/0039605 | A1* | 4/2002 | Moore ................ B29C 53/566 |
| | | | 425/371 |
| 2015/0375491 | A1* | 12/2015 | McDonald ............. B32B 37/10 |
| | | | 156/172 |

FOREIGN PATENT DOCUMENTS

| | | |
|---|---|---|
| DE | 2834924 | 2/1979 |
| EP | 3211127 | 8/2017 |
| FR | 1461528 | * 11/1966 |
| JP | 10508565 | 8/1998 |
| WO | 9609238 | 3/1996 |

OTHER PUBLICATIONS

Wesely et al., Method and Device for Manufacturing a Pipe Shell From an Insulating Material, Japanese Patent Application Serial No. JP2021546678, filed Oct. 6, 2020, Office Action.

* cited by examiner

METHOD AND DEVICE FOR MANUFACTURING A PIPE SHELL FROM AN INSULATING MATERIAL

BACKGROUND OF THE INVENTION

The invention relates to a method and a device for manufacturing a pipe shell from an insulating material.

It is known to wind webs of insulating material around a core and to thus manufacture pipe shells. Some of these devices comprise a core and a pre-tensioned belt which wraps around the core partially. By means of this belt a web of the insulating material which is provided with a binding agent is wound around the core. For the at least partial hardening of the binding agent the cores are frequently heated electrically. Since the pipe shells are, as intended, formed of a well-insulating material, the heat transport through the pipe shell is, however, bad, so that the core has to be heated strongly. The inner diameter of the pipe shell is burnt in this process, which is known under the catchword "black core".

In accordance with the state of the art described in EP 0 206 310 A2 or in WO 89/12776 A1, first of all a cylindrical core is placed in the device. Then, the belt is wound around the core such that the wrap-around angle is more than 180°, pursuant to EP 0 206 310 A2 at least 270°, and the belt is pre-tensioned by means of a tensioning roller such that it is contact with a sheath surface of the core. The belt itself is designed as a circulating continuous belt and is driven circulatingly by means of a drive roller. A web of the insulating material is fed by the belt and is drawn in between the belt and the core. The leading end of the web gets between the trailing end of the web and the core after the first revolution, so that the web is wound up completely in layers. As much web of the insulating material is wound up until the desired wall thickness for the pipe shell has been reached. In this process, the tensioning roller releases belt successively.

Another method and a device for manufacturing pipe shells are known from CA 706 364 A in which also a web of insulating material is wound up on a core by means of a circulating belt.

EP 0 551 228 A1 describes a method and a device for compressing and winding up a mineral wool fleece so as to reduce its volume for transport. The fleece is wound up by a belt without being wound around a core, though. A very similar method and a very similar device are illustrated in WO 98/40297 A1.

Due to the high wrap-around angle of the belt around the core in the state of the art the inserting of a new core and the removing of a completely wound core is very time-consuming and very complex since the belt each time has to be placed around the core and/or has to be removed from the wound-up core with the large angle. This results in relatively high cycle times. Furthermore, the pressing force at which the belt presses the web of insulating material against the core can be controlled only poorly due to the high wrap-around angle. Thus, the bulk density of the finished pipe shell can also be adjusted poorly only. This is at the expense of the quality of the pipe shell.

A method according to the preamble of claim 1 is known from DE 1 571 482. The device illustrated therein comprises a core which is partially wrapped around by two or three strands of one and the same belt or by two separate belts. The core of this device is rotatably mounted on a swivel arm. The web of insulating material is removed from a table by means of the lower strand and is fed to the core and wound upon the core by means of the strands. After the web has been wound up completely, the core is swiveled out between the strands along with the wound-up web and is again placed on the table. The wound-up web is thus removed contrary to the direction from which it was fed. Thus, the cycle time is still unsatisfactory.

Starting out from this, the problem underlying the invention is to provide a method and a device for manufacturing pipe shells by which the cycle times can be further reduced while the quality of the pipe shell is simultaneously improved.

For solution of this problem the method according to the invention comprises the features of claim 1. It is characterized in that the at least one wound-up web of insulating material is removed in a radial direction of the core which is not opposite to the direction in which the at least one web of insulating material was fed by the one belt. The wound-up web of insulation material is especially discharged by the same belt that has also fed the at least one web. The device according to the invention comprises the features of claim 4.

In accordance with the invention it is thus provided that the wound-up web is not removed in the opposite direction of its feeding direction. In other words, the direction of the feeding of the web is sufficiently different, such as by 180° to the direction of removal of the wound-up web. In a particularly preferred manner the web is, after the winding up, even conveyed further in the same direction in which it was fed. Thus, if the web was, for instance, fed to the core from the left, the wound-up web will be removed to the right. This makes it possible to provide a new web for the manufacturing of a new pipe shell while the web is wound up and/or removed. Thus, the cycle times can be further reduced.

Advantageous further developments of the invention are the subject matter of the dependent claims.

Thus, for instance, each belt is guided through the contour rollers and through deflection rollers and pre-tensioned by a tensioning roller, wherein the arrangements of the belts with the respectively associated contour rollers, the deflection rollers and the tensioning roller are designed symmetrically. Two identical arrangements may then be used, which facilitates the manufacturing of the device.

Furthermore, the arrangements of the belts with the respectively associated contour rollers, the deflection rollers and the tensioning roller may collectively be movable away from each other and toward each other. This makes it possible to further facilitate the exchange of core.

Expediently, at least one of the belts should be circulatingly drivable. The core and, via the core, the other belt would then be dragged along, which would facilitate driving. However, since driving forces then would also have to be transferred through the web of insulating material, it is preferred that both (or as the case may be all) belts are driven. The belts should then be driven synchronously to each other for minimizing slip. As the case may be, the core may also be driven in order to avoid slip completely.

It is, however, also conceivable to drive the belts specifically with different speeds. Stretching or compressing effects ("crepage") can be achieved by the specifically different speeds of the belts.

The contour rollers are preferably arranged to be displaced in a direction parallel to a symmetry plane between the winding devices. Thus, the wrap-around angle of each belt around the core does not vary or varies only slightly if the contour rollers are displaced for adjusting the clearance.

In accordance with a further development of the invention a heating gas, especially hot air, is blown through the core into the web of the insulating material. In accordance with a further development of the device according to the invention the core comprises for this purpose a gas-permeable sheath adapted to be impacted from the interior with a heating gas, especially hot air. The hot air is blown through the sheath from the interior into the web. This process starts already during the winding process, preferably after a first complete revolution of the core, i.e. once a first layer of the web has been wound up.

In the state of the art pursuant to EP 0 206 310 A2 the binding agent in the wound-up web of insulating material is heated and hence hardened by a radiation source which is preferably arranged outside of the core, but may also be arranged within the core. In the case of a core heated from the interior, however, as mentioned already initially, the temperature of the core must be chosen to be very high so as to transport sufficient heat through the insulating material to outer edge layers. Thus, there exists the danger known from practice that the interior of the pipe shell burns. Furthermore, the complete hardening is relatively time-consuming, so that the cycle times are further aggravated. In the state of the art pursuant to WO 89/12776 A1 no hardening of the binding agent is provided. The core with the wound-up web of insulating material thus has to be removed from the device and the binding agent has to be hardened separately. This requires a high number of cores. Furthermore, there exists the danger that the wound-up web will unintentionally unwind again during transport, which is again at the expense of the quality of the pipe shell.

By means of the heating gas, however, an even distribution of temperature in the wound-up web of insulating material can be produced quickly and reliably, and hence the binding agent can be hardened rapidly. The quality of the pipe shell is improved and the cycle times are shortened. The cycle time can be shortened further if the binding agent is hardened only partially by the hot air blown in from the core. This already stabilizes the partially hardened pipe shell sufficiently and the core can be pulled out in the axial direction. The core is instantly available for new winding. The hardening of the pipe shell is finished in a separate furnace. Thus, the number of required cores is at the same time also reduced. As such, only one core per diameter is required.

In accordance with a constructive design of the invention the core is formed of two half cores. They are arranged one behind the other viewed in the axial direction of the core such that the half cores can be pulled out of the pipe shell in opposite directions. Each core thus only covers half the path during pulling out, so that this procedure is also accelerated. Furthermore, the cores are pulled out of the pipe shell in opposite directions, so that the friction forces of each half core with the pipe shell are substantially offset against each other. This reduces the necessary retention force on the pipe shell during pulling out, which minimizes the risk of damage.

BRIEF DESCRIPTION OF THE DRAWINGS

The invention will be explained in detail in the following by means of an embodiment illustrated in the drawing. The drawing shows.

DETAILED DESCRIPTION OF EMBODIMENTS OF THE INVENTION

Figure 1:
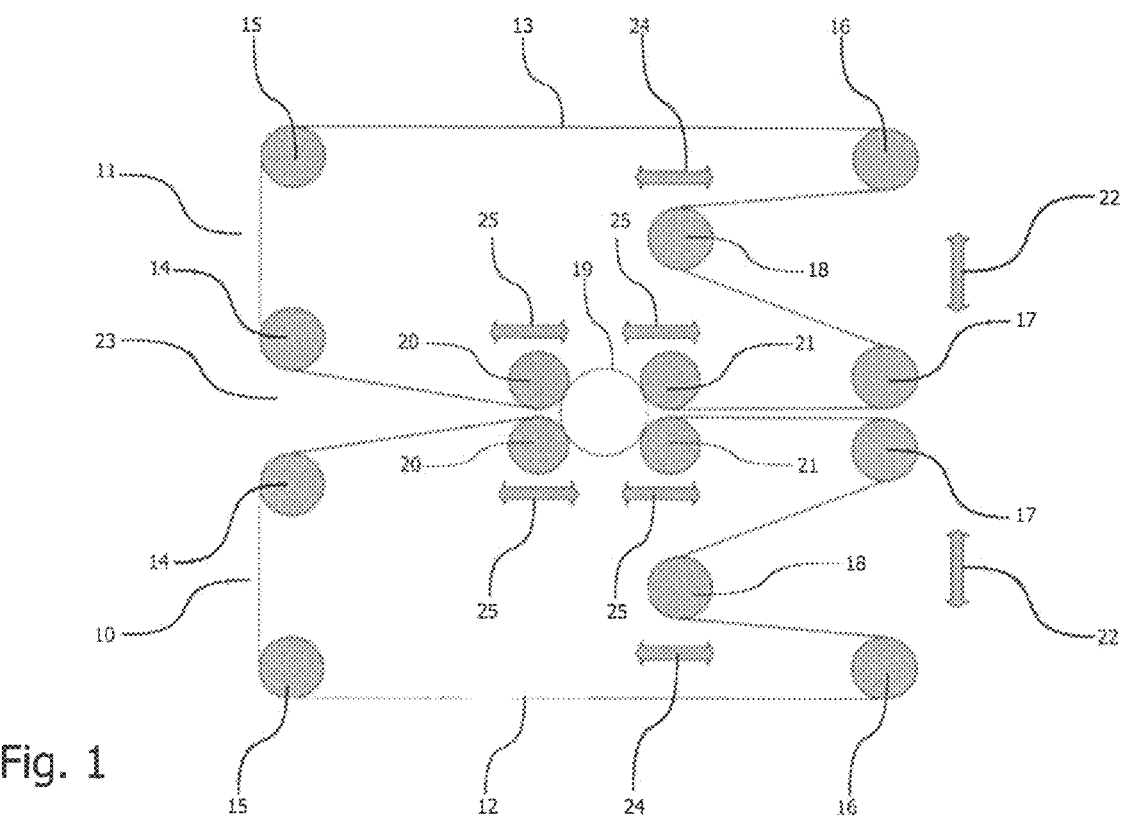
FIG. 1 a device with the features of the invention in a schematic side view.

The device shown in FIG. 1 serves for the manufacturing of pipe shells for the insulation of pipelines. The device comprises on principle two half winding devices, one bottom winding device 10 and one top winding device 11. As may be seen from FIG. 1, the bottom winding device 10 and the top winding device 11 are symmetrical to each other, so that two identical assemblies may be used in a way mirror-inverted to each other. A symmetry plane thus results between the two winding devices 10, 11 which extends horizontally in the instant case. The winding devices 10, 11 may, however, also be designed non-symmetrically to each other.

The bottom winding device 10 comprises a belt 12 designed as a circulating continuous belt 12. Equally, the top winding device 11 comprises a belt 13 which is also designed as a circulating continuous belt. The belts 12, 13 are guided around deflection rollers 14, 15, 16 and 17 and are pre-tensioned with an adjustable tensile strength by a tensioning roller 18. At least one of the deflection rollers 14 to 17 is driven rotatingly and thus also drives the respective belt 12 or 13. For avoiding slip, a positive locking, for example toothed, connection may be provided between the respectively driven deflection rollers 14 to 17 and the associated belt 12 or 13. Additionally or alternatively the tensioning roller 18 may also be designed to be drivable and possibly toothed.

A core 19 is provided between the belts 12 and 13. Different cores 19 with different outer diameters are provisioned. For the manufacturing of a pipe shell the suitable core 19 is selected in correspondence with the desired inner diameter of the pipe shell. The core 19 is mounted to be rotated about its longitudinal axis and is taken along by the movement of the belts 12 and 13. The core may, however, also be driven rotatingly itself, in particular if slip between the core 19 and the belts 12, 13 is to be avoided. In this case the core 19 is driven synchronously to the speed of the belts 12, 13. It is also conceivable that merely the core 19 is driven rotatingly and takes along the belts 12, 13.

Each winding device 10, 11 comprises two contour rollers 20 and 21 which arrange for it that the belts 12 and 13 wrap around the core 19 in a particular radian. In the instant case the contour rollers 20, 21 are arranged such that the belts 12, 13 wrap around the core 19 by somewhat less than 180° each. Both belts 12, 13 jointly accordingly thus wrap around the core 19 almost completely.

The core 19 is provided with a gas-permeable sheath and may be impacted from the interior with a heating gas, concretely hot air, which gets radially to the outside through the gas-permeable sheath.

The bottom winding device 10 and the top winding device 11 are altogether, as illustrated by the respective double arrow 22, movable toward each other and away from each other, in the instant case concretely to the top and to the bottom. With reference to the respective winding device 10 or 11 the deflection rollers 14 to 17 are arranged on a fixed position and move jointly with the winding device 10, 11 they are associated with. The deflection rollers 14 of the bottom and top winding devices 10, 11 are, as recognizable in FIG. 1, spaced apart from each other such that a section of the belts 12, 13 which extends between the deflection roller 14 and the contour roller 20 opens, starting out from the contour rollers 20, in a V-shaped manner away from the core 19 and thus forms an inlet aperture 23. The tensioning rollers 18 are, as indicated by the double arrow 24, horizontally displaceable, wherein another direction of the displacement movement which is suitable for the tensioning of the respective belt 12, 13 is also possible. The tensioning rollers 18 are displaced appropriately for the tensioning of the respective belt 12 or 13.

The contour rollers 20, 21 are movable away from the core 19 and toward the core 19, as indicated by the double arrows 25. In the instant case the contour rollers 20, 21 are displaceable horizontally, or quite general in parallel to the symmetry plane between the winding devices 10, 11, wherein a different direction of displacement would also be possible. The horizontal direction of displacement is, however, preferred since it does not or only slightly change the wrap-around angle of the respective belt 12, 13 around the core 19.

With the device described, pipe shells are manufactured as follows:

First of all the bottom winding device 10 and the top winding device 11 are driven apart. Now, a core 19 is introduced in the device between the belts 12, 13. The outer diameter of the core 19 is chosen in correspondence with the desired inner diameter of the pipe shell to be manufactured. Now, the winding devices 10, 11 are driven together again, so that the position illustrated in FIGS. 1 and 2 results. The contour rollers 20 and 21 are driven closely to the core 19, so that the belts 12, 13 each wrap around the core 19 by almost 180°. As illustrated in FIG. 1, the belts 12, 13 are driven and circulate as indicated by the arrows 26, 27. The direction of circulation of the belts 12, 13 is clockwise each, so that the section of the lower belt 12 moves toward the core 19 at the inlet aperture 23. The core 19 rotates in correspondence with the direction of the belts 12, 13 anti-clockwise, as indicated by the arrow 28.

Figure 2:
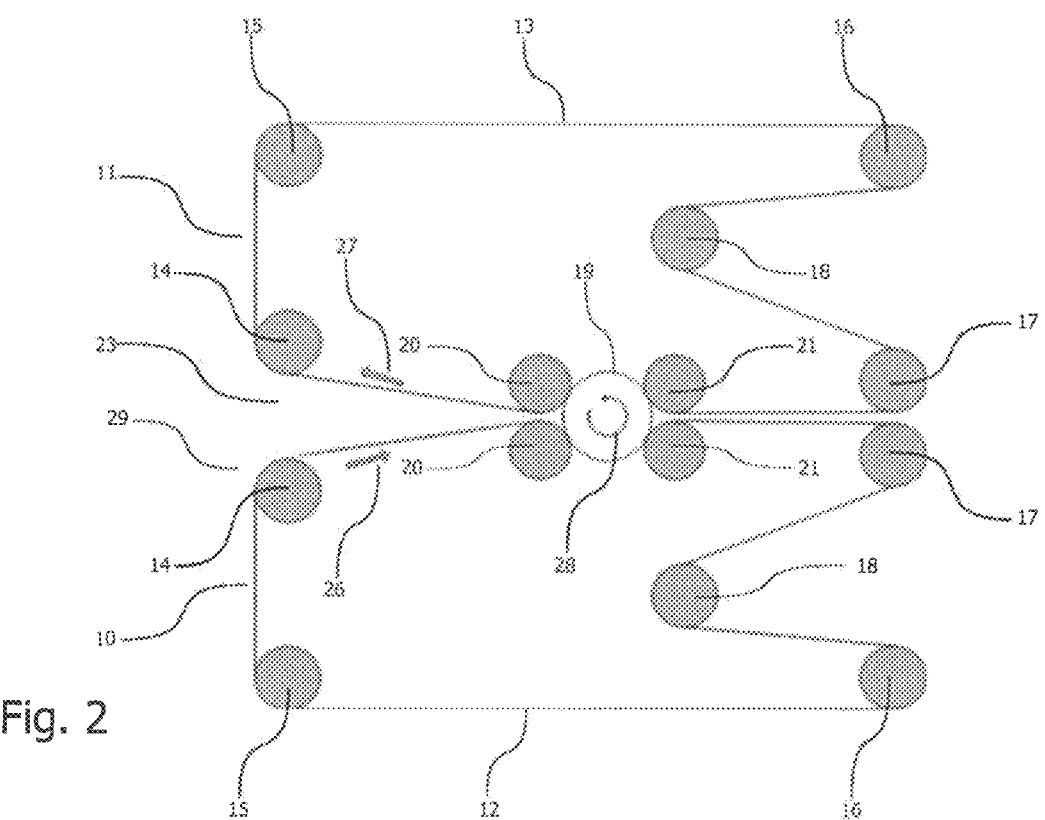
FIG. 2 the device according to FIG. 1 during the initial feeding of a first material web.
Figure 3:
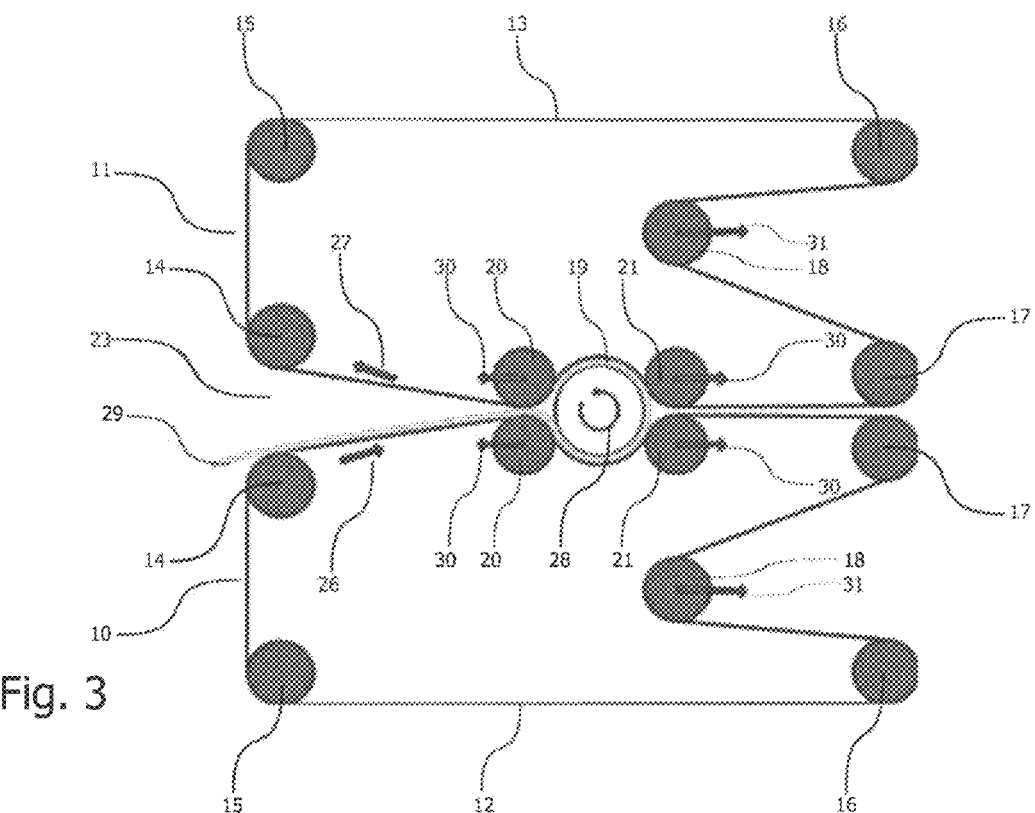
FIG. 3 the device according to FIG. 1 with a partially wound-up first material web.

A web 29 of insulating material which is provided with a binding agent, in practice of mineral wool, is placed in the inlet aperture 23 in a suitable manner and comes to rest on the corresponding section of the lower belt 12 (FIG. 2). Thus, the web 29 is moved toward the core 19 by the belt 12, so that the leading end of the web 29 gets into contact with the sheath of the core 19. The web 29 is thus drawn into a gap between the core 19 and the lower belt 12. Due to the further transport of the web 29 the leading end of the web 29 first leaves the gap between the core 19 and the lower belt 12 and gets further into a gap between the core 19 and the upper belt 13. The contour rollers 20, 21 are successively moved away from the core 19, as illustrated by the arrows 30 in FIG. 3. The tensioning rollers 18 yield correspondingly (arrow 31). Via the contour rollers 20, 21 and above all by means of the tensioning of the belts 12, 13 adjusted via the tensioning rollers 18, the clearance between the belts 12, 13 and the core 19 and hence the bulk density of the later pipe shell is adjusted. The tensioning roller 18 moves in a force-regulated manner for this purpose.

Figure 4:
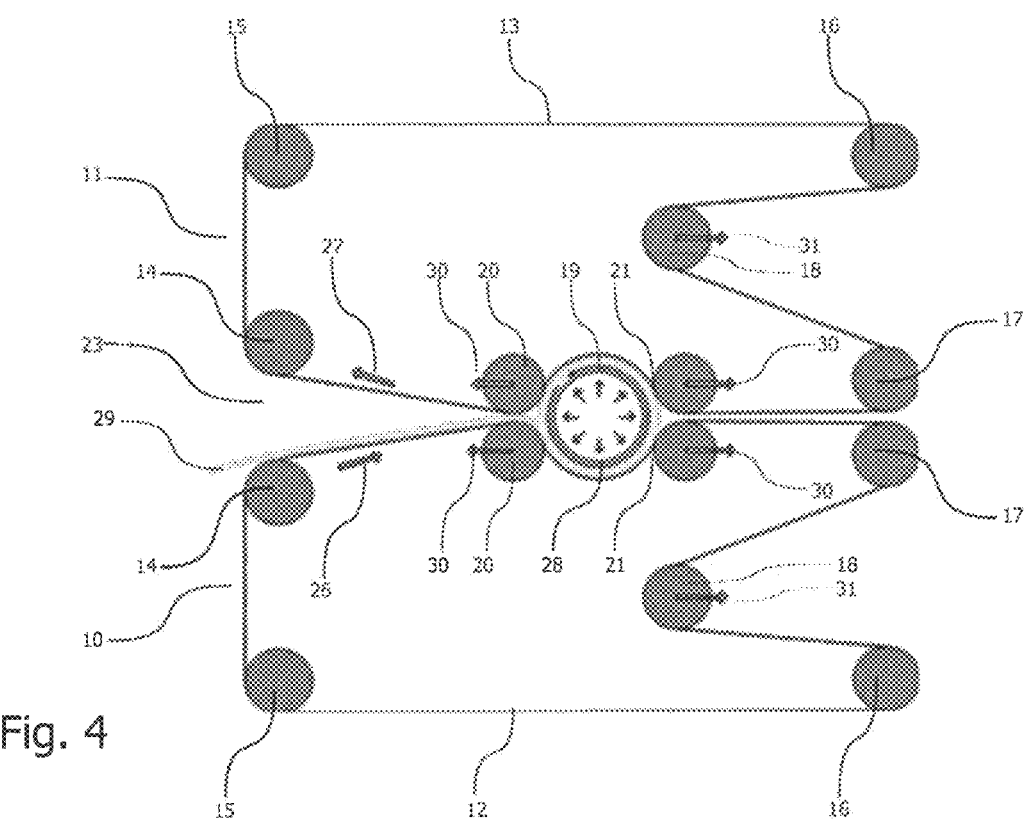
FIG. 4 the device according to FIG. 1 with a further wound-up first material web with a beginning heating process.

As illustrated in FIG. 4, the leading end of the web 29 gets, by the further transport of the web 29, after a full revolution of the core 19 between the further fed web 29 and the core 19. In correspondence therewith, the contour rollers 20, 21 are moved further away from the core 19 and the tensioning rollers 18 are repositioned. Accordingly, the clearance between the belts 12, 13, on the one hand, and the core 19, on the other hand, increases. Now, the core 19 is also impacted with hot air from the interior, said hot air flowing through the gas-permeable sheath of the core 19 to the outside (radially outwardly directed arrows within the core 19 in FIG. 4) and into the first layer of the insulating material The binding agent in the insulating material is already hardened partially thereby. The core 19 meanwhile continues rotating along with the belts 12, 13. The web 29 continues being wound up.

Figure 5:
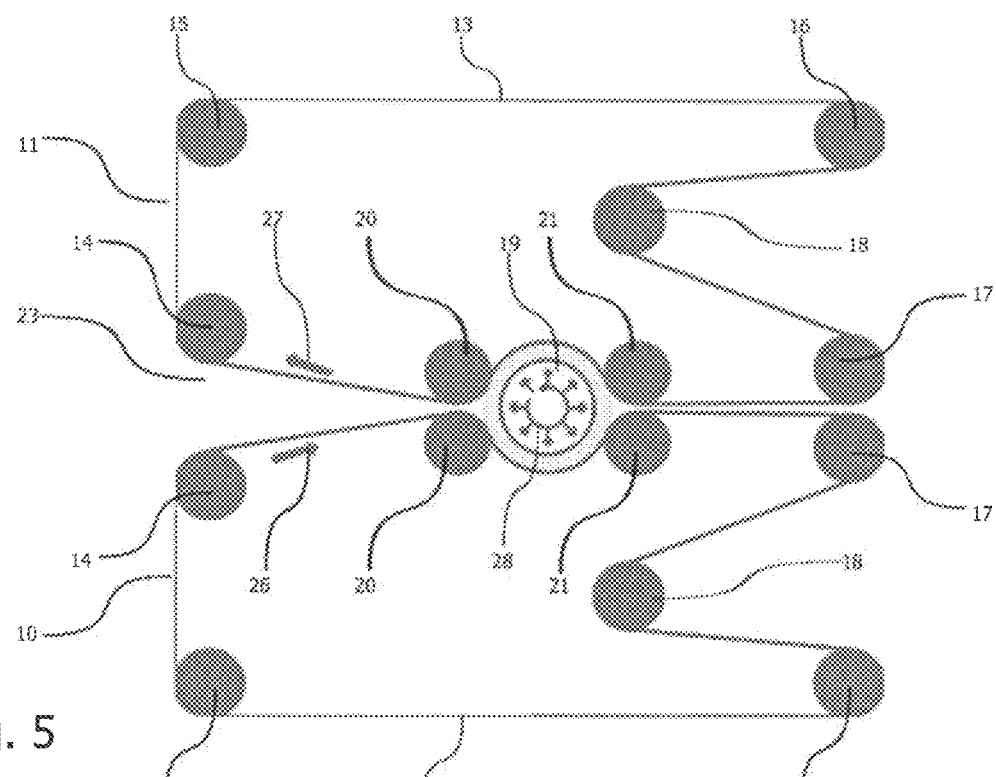
FIG. 5 the device according to FIG. 1 with a completely wound-up first material web with a continued heating process.

FIG. 5 illustrates the device with a first web 29 completely wound up on the core 19. Depending on the length of the web 29, one layer or else two or more layers have been produced. The core 19 continues rotating along with the belts 12, 13 while the core 19 continues being impacted with hot air from the interior, said hot air now flowing into the completely wound-up web 29 and hardening the binding agent partially.

Figure 6:
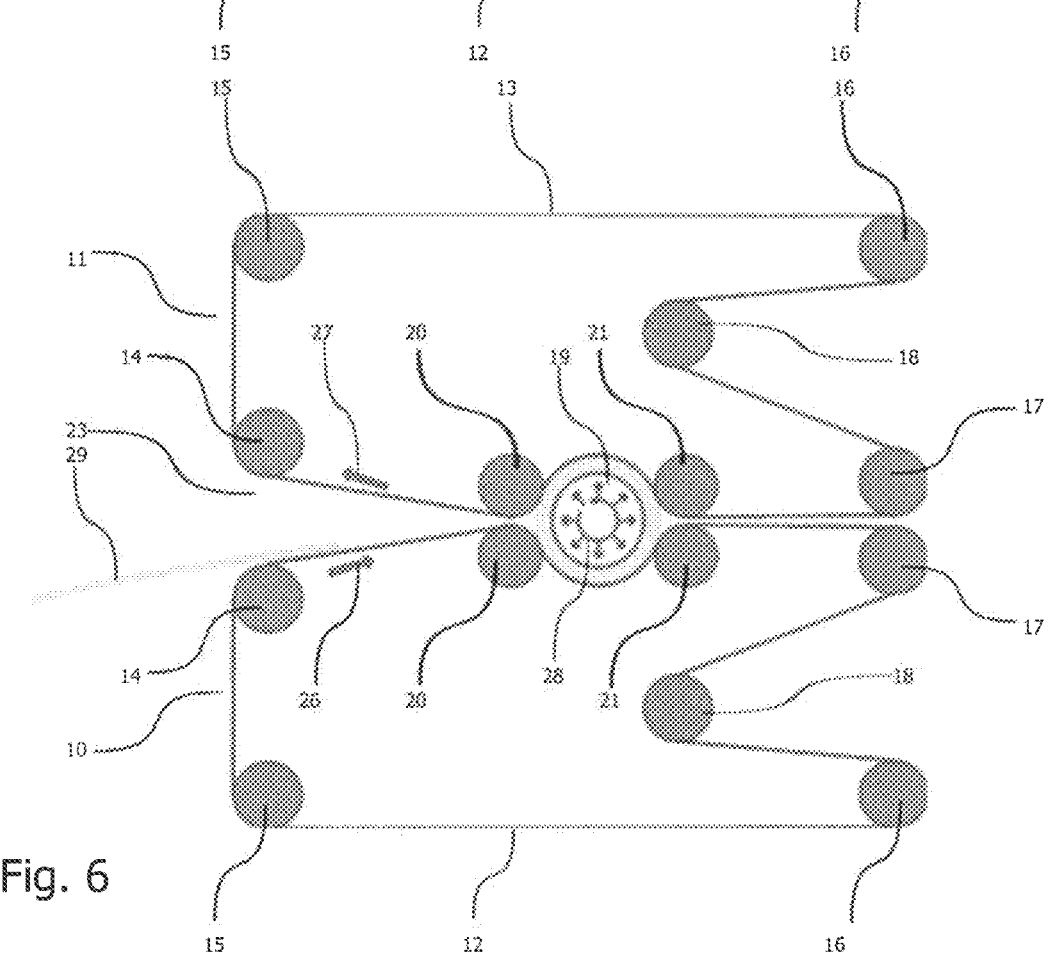
FIG. 6 the device according to FIG. 1 during the feeding of a further material web with a further continued heating process.

If a pipe shell with even larger wall thickness, i.e. also larger outer diameter, is desired, one or a plurality of further webs 29 of the insulating material are fed. This is shown in FIG. 6. The one or the plurality of further webs 29 are now wound up on the respectively prior wound web 29 in the same way as the first web 29. In this process, the core 19 is continuously impacted with hot air from the interior, said hot air flowing through the webs 29 and thus hardening the binding agent partially.

Figure 7:
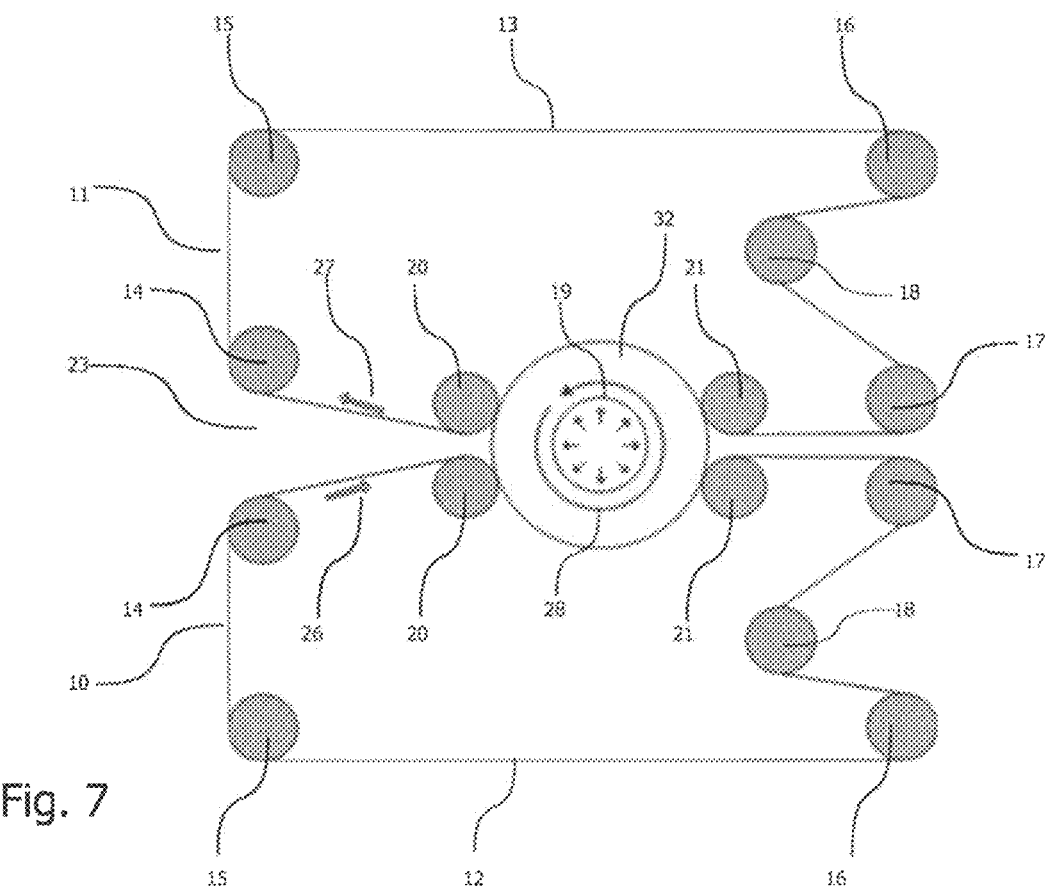
FIG. 7 the device according to FIG. 1 with a completely wound-up further material web with a further continued heating process.

As soon as the desired outer diameter and thus the desired wall thickness of the pipe tube have been achieved, the winding process is terminated. Furthermore, the supply of hot air is also stopped as soon as the binding agent has been sufficiently hardened partially. Ideally, this occurs simultaneously with the end of the winding process. A partially hardened pipe shell 32 now exists on the core. As the case may be, the belts 12, 13 continue circulating along with the core 19 until the supply of hot air can also be terminated, i.e the pipe shell 32 has been sufficiently hardened partially (FIG. 7). This produces a round outer surface of the pipe shell 32, so that it need hardly or not at all be rounded by grinding any more. The loss of material by grinding is thus minimized or completely avoided. Depending on the degree of hardening, a separate smoothing band for smoothing the outer surface may further be renounced.

The tubular pipe shell 32 which is partially hardened now is finally removed from the device. This may take place in that the winding devices 10, 11 are again driven apart and the partially hardened pipe shell 32 is removed from the device along with the core 19. Since, however, the pipe shell 32 is already sufficiently hardened partially and is thus stabilized, the core 19 may first of all also be pulled out of the pipe shell 32 in the axial direction and only then the pipe shell 32 may be removed from the device. The belts 12, 13 meanwhile hold the pipe shell 32. The core 19 is instantly available again for the manufacturing of a further pipe shell. Only one core 19 per size (desired inner diameter of the pipe shell) is required for the device.

In the instant case the web 29 was fed to the core 19 by the belt 12 from the left side. The wound-up web and/or the (partially) hardened pipe shell 32 is removed from the device in the same direction, i.e. also to the right, away from the core 19. This takes place preferably in that the wound-up web and/or (partially) hardened web is also discharged from the device by the belt 12 which is still circulating in the same direction.

As soon as the pipe shell 32 has been removed from the device, the pipe shell 32 is hardened completely in a separate furnace and is subsequently divided e.g. in two half shells in the longitudinal plane.

The core 19 may be formed integrally and is then pulled out from the pipe shell 30 over the entire length thereof. However, two partial cores positioned one behind the other in the axial direction of the core 19 and/or the pipe shell 32 may also be provided. Each of the partial cores is then pulled out of the pipe shell 32 in the axial direction to the front and/or the rear. For each partial core a shorter path thus results, so that the core 19 can altogether be pulled out of the pipe shell 30 more quickly.

The device is illustrated in the drawing such that the symmetry plane between the bottom winding device 10 and the top winding device 11 extends in a horizontal plane. The device may, however, also be oriented differently, so that the symmetry plane between the winding devices 10, 11 extends at an angle to the horizontal or even vertically. To the extent that a horizontal direction is mentioned in the instant description and the enclosed claims, this always means the direction in which the symmetry plane between the winding devices 10, 11 extends.

It is also possible to provide three or even more winding devices whose belts will then wrap around the core preferably each in a third of a circle or a quarter of a circle or a correspondingly smaller circular segment. This makes it possible to achieve an even more regular pressure distribution by the belts on the web of insulating material. Since, however, the device becomes more complex thereby, the illustrated embodiment with two winding devices 10, 11 is preferred.

The foregoing description assumes that the belts 12, 13 are driven with equal circulation speed and that also the core 19, to the extent that it has a separate drive and is not dragged along by the belts, is driven synchronously thereto. It is, however, also conceivable to drive the belts 12 and 13 specifically with different speeds. By the specifically different speeds of the two belts 12, 13 stretching or compressing effects ("crepage") can be achieved.

Since the inner web 29 and/or at least the inner layer(s) of the web 29 have already been hardened (partially) while winding up is continued, the tensioning of the belts 12, 13 can also be varied by an appropriate force regulation of the tensioning rollers 18 from layer to layer and/or from web 29 to web 29, and hence also the bulk density. Thus, for instance, a higher bulk density may be provided in the interior and a lower bulk density in the outer area.

Since only one core 19 per desired inner diameter of the pipe shell 32 is required, the exchange of core cannot only be facilitated, but can also be automated. Thus, the cores 19 may, for instance, be provisioned in a core storage from which they are taken automatically. They might also be provisioned in a kind of revolver. The revolver moves the core 19 with the desired diameter in front of the device and a displacing unit then displaces the core 19 axially to the position between the winding devices 10, 11 illustrated in the Figures.

The pipe shell 32 may also be removed from the device in that merely the rear part in the discharge direction, i.e. the contour roller pair 21 and the roller pair 17, are driven apart in an appropriate manner.

The invention claimed is:

1. A method for manufacturing a pipe shell (32) of an insulating material by at least one web (29) of the insulating material which is provided with a binding agent being wound around a core (19) by means of at least two opposing belts (12, 13) which wrap around the core (19) partially, comprising the following method steps:
the at least one web (29) of insulating material is fed to the core (19) by means of one of the belts (12),
the at least one web (29) of insulating material is wound upon the core (19) by the at least two belts (12, 13),
an at least one wound-up web (29*a*) of insulating material is removed between the at least two belts (12, 13),
wherein the at least one wound-up web (29*a*) of insulating material is removed in a radial direction of the core (19) which is opposite to a direction in which the at least one web (29) of insulating material was fed by the one of the two opposing belts (12), characterized by the at least one wound-up web (29*a*) being discharged by the one of the two opposing belts (12).

2. The method according to claim 1, characterized in that a heating gas, wherein the heating gas comprises hot air, is blown through the core (19) into the web (29*a*) of the insulating material after the web (29*a*) has been partially wound around the core (19) with at least one complete revolution.

3. The method according to claim 2, characterized in that the binding agent in the web (29) of insulating material is hardened only partially by the heating gas, wherein the heating gas comprises hot air, and is hardened completely in a separate furnace after the complete winding of the web (29*a*) to form the pipe shell (32) after the core (19) has been removed from the pipe shell (32).

\* \* \* \* \*